United States Patent
Stadler

(10) Patent No.: US 7,414,736 B2
(45) Date of Patent: Aug. 19, 2008

(54) POSITION MEASURING ARRANGEMENT AND METHOD FOR CONTROLLING SCANNING SIGNALS OF THE POSITION MEASURING ARRANGEMENT

(75) Inventor: Josef Stadler, Ostermiething (AT)

(73) Assignee: Dr. Johannes Heidenhain GmbH, Traunreut (DE)

( * ) Notice: Subject to any disclaimer, the term of this patent is extended or adjusted under 35 U.S.C. 154(b) by 35 days.

(21) Appl. No.: 11/449,272

(22) Filed: Jun. 8, 2006

(65) Prior Publication Data

US 2006/0288598 A1 Dec. 28, 2006

(30) Foreign Application Priority Data

Jun. 25, 2005 (DE) ........................ 10 2005 029 553

(51) Int. Cl.
*G01B 11/14* (2006.01)
(52) U.S. Cl. ........................ 356/614; 356/616; 356/620
(58) Field of Classification Search ......... 356/614–616, 356/138, 499, 140, 141.1, 141.5; 250/231.13–231.18, 250/559.29, 237 G
See application file for complete search history.

(56) References Cited

U.S. PATENT DOCUMENTS

| | | | | |
|---|---|---|---|---|
| 4,432,640 A | * | 2/1984 | Grage et al. | ................ 356/4.02 |
| 5,241,173 A | | 8/1993 | Howley et al. | |
| 5,604,590 A | * | 2/1997 | Cooper et al. | ................ 356/338 |
| 6,973,355 B2 | * | 12/2005 | Tisue | .......................... 700/56 |
| 2004/0026603 A1 | * | 2/2004 | Burgschat et al. | ......... 250/208.1 |

FOREIGN PATENT DOCUMENTS

EP 0 514 081 B1 2/1996

* cited by examiner

*Primary Examiner*—Gregory J. Toatley, Jr.
*Assistant Examiner*—Tri T Ton
(74) *Attorney, Agent, or Firm*—Brinks Hofer Gilson & Lione

(57) ABSTRACT

A method for controlling a scanning signal of a light-electric position measuring arrangement, the method includes in a first mode of operation providing the scanning signal to a control device and the control device comparing an amplitude of the scanning signal with a predetermined level and makes a differentiation as to whether the amplitude lies above or below the predetermined level. In a second mode of operation the method includes reducing the amplitude of the scanning signal by attenuating light within a light beam path, and the reduced amplitude is compared with the predetermined level and generating an indication which is suitable for controlling a basic setting of a scanning head relative to a scale.

11 Claims, 3 Drawing Sheets

POSITION MEASURING ARRANGEMENT AND METHOD FOR CONTROLLING SCANNING SIGNALS OF THE POSITION MEASURING ARRANGEMENT

BACKGROUND

Applicant claims, under 35 U.S.C. § 119, the benefit of priority of the filing date of Jun. 25, 2005 of a German patent application, copy attached, Serial No. 10 2005 029 553.3, filed on the aforementioned date, the entire contents of which is incorporated herein by reference.

1. Field of Invention

The present invention relates to a position measuring arrangement, having a scale, a scanning head, and a control device for comparing an amplitude of the scanning signal with a predetermined level. The present invention further relates to a method for controlling scanning signals.

2. Discussion of Related Art

The control of position-dependent scanning signals of a position measuring arrangement is necessary in particular during the mounting of the position measuring arrangement or after the position measuring arrangement has been mounted in order to assure the longest possible measuring operations. The signal quality and the measurement accuracy are considerably dependent on the exact adjustment of the scanning head in relation to the scale. In order to assure a high degree of measuring accuracy in connection with an incremental position measuring arrangement, the scanning signal generated by the scanning head should have a high and level amplitude, as well as a mutual phase shift $\phi$ of 90°. The amplitude is affected by the distance between the scanning head and the scale, and the phase shift by the tilt of the scanning head relative to the measuring direction.

These parameters of the analog scanning signals can be represented very well by an oscilloscope. To this end the two scanning signals, which have been phase-shifted by 90° in relation to each other, are fed to the two channels of a dual-beam oscilloscope, so that a Lissajous figure is created on the display screen. The radius of the Lissajous figure constitutes a measurement of the amplitudes, as well as the phase relationship, of both scanning signals.

For simplifying the checking of position-dependent scanning signals, a position measuring arrangement has been proposed in EP 0 514 081 B1, which is laid out for controlling the amplitude of analog scanning signals. The position measuring arrangement contains a first control device which makes a differentiation as to whether the amplitude is located above or below a predetermined level, wherein the level corresponds to an error level, below which the scanning signal is not dependable, but above which the scanning signal is dependable and can be used for position measuring. It has been found that the control of a correct installation of a position measuring arrangement is not possible by this error level. Therefore, for controlling the correct installation, a second error level was used for comparison with the amplitude of the scanning signal, which is considerably larger than the first error level, in order to generate by this second error level an indication which is suitable for the installation control. A second control device is provided for this. Therefore two control devices are required for controlling the amplitude of the scanning signal after the installation of the scanning head, i.e. for controlling the basic setting, and during the subsequent measuring operation.

OBJECTS AND SUMMARY OF THE INVENTION

An object of the present invention is based on reciting a position measuring arrangement and a method for controlling at least one position-dependent scanning signal, with which the amplitude of the scanning signal can be realized in a simple manner.

This object is attained by a position measuring arrangement including a scale having a graduation which can be light-electrically scanned and a scanning head. The scanning head includes a light source that generates a light beam along a light beam path and a detector, wherein the scale is arranged in the light beam path between the light source and the detector, and the detector generates a scanning signal. A control device that makes a comparison of an amplitude of the scanning signal with a predetermined level, wherein the control device differentiates as to whether the amplitude lies above or below the predetermined level. An attenuator in the light beam path for reducing the amplitude of the scanning signal in order to generate an indication, via the comparison of the amplitude of the scanning signal with the predetermined level, whether or not a setting of the scanning head relative to the scale is permissible for correct position measurement.

The above object is attained by a method for controlling a scanning signal of a light-electric position measuring arrangement, the method includes in a first mode of operation providing the scanning signal to a control device and the control device comparing an amplitude of the scanning signal with a predetermined level and makes a differentiation as to whether the amplitude lies above or below the predetermined level. In a second mode of operation the method includes reducing the amplitude of the scanning signal by attenuating light within a light beam path, and the reduced amplitude is compared with the predetermined level and generating an indication which is suitable for controlling a basic setting of a scanning head relative to a scale.

Several advantages of the present invention are seen to be that it is possible to optimally control the installation, as well as the measuring operations, of a position measuring arrangement. Retrofitting of standard commercial position measuring arrangements is easily possible.

In a first mode of operation, the present invention makes possible the control of the scanning signals in the course of the ongoing measuring operation by comparing the momentary amplitude with an error level. The error level defines the lowermost threshold of the amplitude at which a position measurement is still permissible. Since it is intended to assure the measuring operation over the longest possible time period without an error report, the distance between an amplitude after starting operations, i.e. after mounting has taken place, and the error level, should be selected to be as large as possible. Now, in order to be able to optimally control the amplitude following the basic setting, a second mode of operation has been provided. In the second mode of operation, the amplitude is considerably reduced by introducing an attenuator into the light beam path, so that the predetermined error level can be used for comparison. If in this state the amplitude does not drop below the error level, it is assured that, after the removal of the attenuator, the scanning signals have the required optimal amplitude for the ongoing measuring operation with a sufficient safety margin with respect to the error level. An optimal basic setting is achieved in this way. A setting, or mounting, with amplitudes as great as possible is assured and a tolerance, which is sufficient for measuring operations, is created. In spite of the comparison with the error level it is avoided that the amplitudes already reach the error level after a short measuring operation.

Further characteristics and advantages of the present invention will become apparent in the course of the following description of an exemplary embodiment by the drawings.

DETAILED DESCRIPTION OF THE PREFERRED EMBODIMENTS

Figure 1:
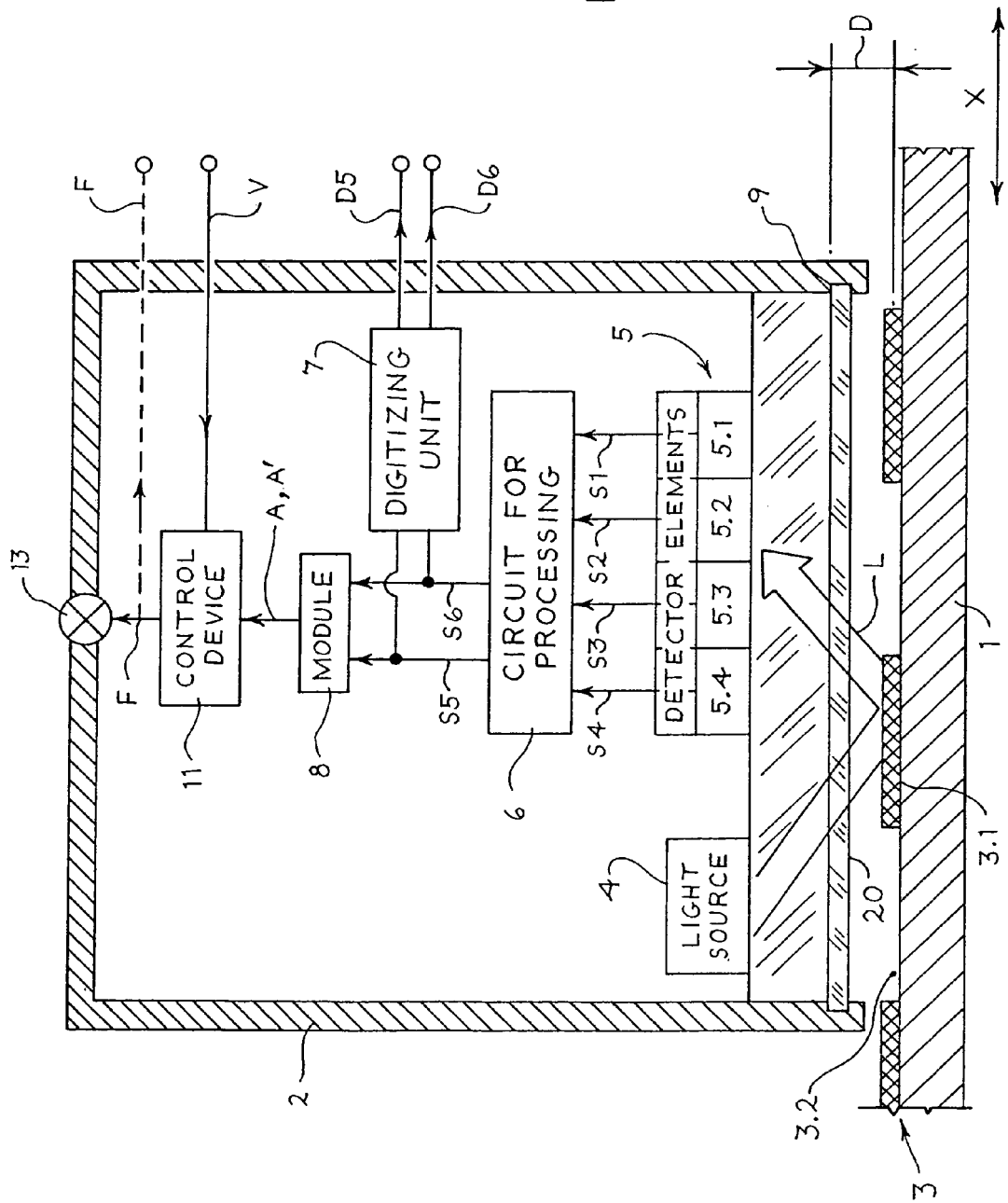
FIG. 1 represents a first embodiment of a position measuring arrangement designed in accordance with the present invention.

The photo-electrical position measuring arrangement represented in FIG. 1 includes a scale 1, as well as a scanning head 2. The scale 1 is, for example, a steel measuring tape which has a graduation 3, having alternating reflective areas 3.2 and non-reflective areas 3.1. The scanning head 2 scans the graduation 3 of the scale 1 in the measuring direction X in that a light beam bundle L is directed, starting from a light source 4, onto the scale 1, this light beam bundle L is modulated at the graduation 3 as a function of position, and is directed to a detector 5. The detector 5 includes several detector elements 5.1, 5.2, 5.3, 5.4, which are dimensioned and arranged in such a way that in a known manner several periodic analog scanning signals S1 to S4 are generated, which are phase-shifted by 90° from each other. A scanning plate, not represented, with a scanning grating in the light beam path L, can also contribute to the generation of the scanning signals S1 to S4, which are phase-shifted with respect to each other.

The analog scanning signals S1 to S4 are fed to a circuit 6 for pre-processing. This circuit 6 generates scanning signals S5 and S6, without offset, by respectively forming the difference between two scanning signals phase-shifted by 180° with respect to each other:

S5=S1−S3
S6=S2−S4
wherein S1=A sin ωt
S2=A cos ωt
S3=−A sin ωt
S4=−A cos ωt

Figure 3:
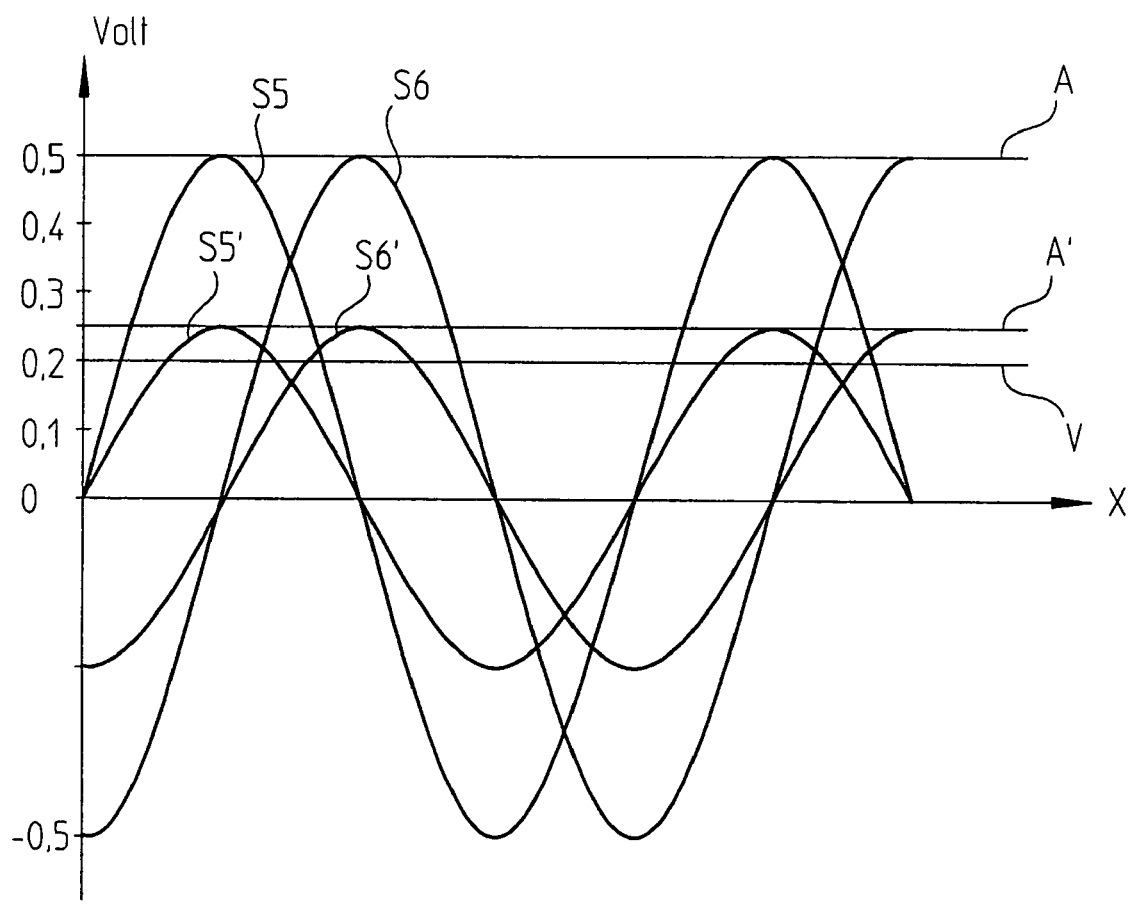
FIG. 3 represents possible scanning signals of the position measuring arrangements of FIGS. 1 and 2.

These analog scanning signals S5, S6 (shown in FIG. 3) are fed to a digitizing unit 7, in which they are interpolated for obtaining a position measuring value whose resolution is better than a graduation period of the incremental graduation 3. Two rectangular signals D5, D6, which are phase-shifted by 90° with respect to each other, are present at the output of the digitizing unit 7 and are supplied to an electronic follow-up device, for example a counter or a numeric control.

An amplitude-proportional signal A (shown in FIG. 3) is formed in a module 8 from the analog scanning signals S1 to S4, or S5 and S6. For this purpose, the module 8 contains known rectifier circuits. The amplitude A can also be determined by calculation in the module 8 by the formation of $A=S5^2+S6^2$, or by a maximum value determination of the scanning signals S5, S6 in that during the crossover of one of the scanning signals S5 the momentary value of the scanning signal S6, which is phase-shifted by 90° to the former, is used as the amplitude A. In what follows, this amplitude-proportional scanning signal A will be called amplitude A only.

In a first mode of operation, the amplitude A is checked for correct size in a control device 11. The amplitude A is compared to a predetermined level V (shown in FIG. 3) in the control device 11. This level V corresponds to an error level, below which the scanning signals S1 to S6 are not dependable, but above which the scanning signals S1 to S6 are dependable and can be used for the ongoing position measurement. If it is determined that the value of the momentary amplitude A lies below the predetermined level V, an error signal F is generated, which can be conducted to the exterior or is supplied to a warning device 13 at the scanning head 2 in order to generate and output an indication which alerts the operator that the amplitude A has attained a value impermissible for correct position measurement, i.e. a value in connection with which the position measurement may not be dependable. In the represented example the warning device 13 is a light source.

Now, to be able to use such a position measuring arrangement known from the prior art also for controlling the correct installation, or the basic setting, and therefore the setting of the scanning distance D, an attenuator 20 can be inserted from a retracted position (wherein the first mode of operation is performed) to a position into the light beam path L in accordance with a second mode of operation in accordance with the present invention. In this second mode of operation the amplitude A of the scanning signals S1 to S6 is reduced to a value A' (shown in FIG. 3) by introducing the attenuator 20 into the light beam path L for controlling the correct installation. This reduced amplitude A' is also compared with the predetermined level V in order to generate an indication suitable for controlling the successful installation of the measuring head 2 in relation to the scale 1. In particular, the reduction of the amplitude A takes place by at least 50%, so that A'≦0.5 A.

It is achieved by this step that it is possible in a first mode of operation to check the correct measuring operation of the position measuring arrangement by the same control device 11 and the same predetermined level V, and to control the basic setting prior to the actual measuring operation.

If the amplitude A during normal measuring operations, without the attenuator 20, has a value of 100%, for example 0.5 V, and if a reduction by 60% is preset as being permissible for assuring the correct measuring operation, the predetermined level V is set at approximately 0.2 V. If the amplitude falls below 0.2 V, an indication is generated which shows that the scanning signals S1 to S6 are not dependable for position measuring.

Figure 2:
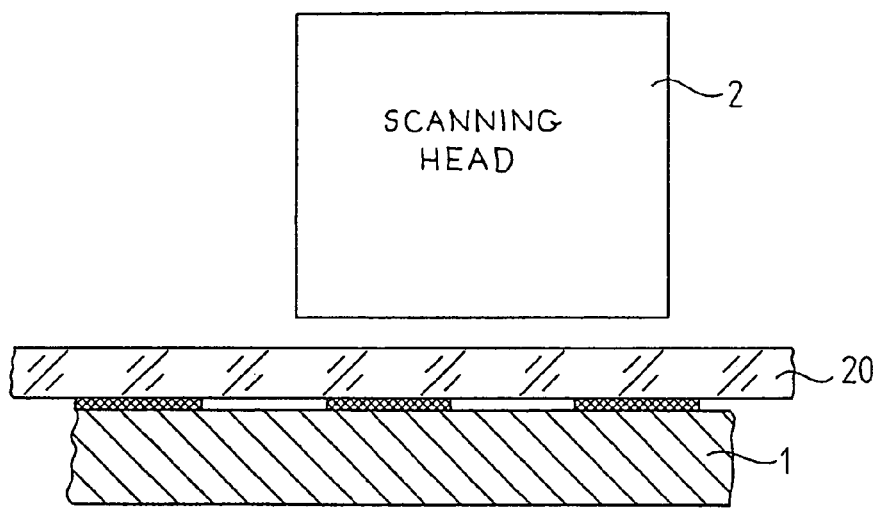
FIG. 2 represents a second embodiment of a position measuring arrangement designed in accordance with the present invention.

For controlling the correct mounting of the position measuring arrangement, the attenuator 20 is introduced into the light beam path L from its retracted position. This dampens the light by approximately 50% and therefore reduces the amplitude by 50%. With correct installation, the desired amplitude is A=0.5 V without damping, and A'=0.25 V with damping. If this reduced amplitude A' is less than 0.2 V, an indication is generated which points out wrong installation. Thus, a tolerance of 20% is permissible for the installation. It is achieved by this step that the amplitude A for operations is set within a range of 0.4 V to 0.5 V, i.e. considerably above the lowest threshold of 0.2 V as the predetermined level V. Thus, a large safety margin for the amplitude A in the first mode of operation (control of the ongoing measuring operation) is assured in this way by the control in the second mode of operation. In accordance with FIG. 1, the attenuator 20 is a light filter, which damps the light L which is emitted by the light source 4 and impinges on the detector 5. The light filter 20 has been removably inserted between the scanning head 2 and the scale 1, for which purpose in accordance with FIG. 1 a sliding guide 9 is provided at the scanning head 2 or, in accordance with FIG. 2, the light filter 20 is removably arranged on the surface of the scale 1. Note that the scanning head 2 represented in FIG. 2 contains the same components as the scanning head 2 represented in FIG. 1.

For reducing the amplitude A it is also possible to cover the light beam path L partially in that the attenuator can be embodied as screws or similar screen elements that can be introduced, for example can be pushed in, screwed in or pivoted in, in order to at least partially cover the light beam.

The light filter 20 between the scanning head 2 and the scale 1 can also simultaneously assume the function of a spacing element for setting the scanning distance D, in that it has the thickness D.

The present invention can be employed in connection with linear, as well as angle measuring arrangements.

The foregoing description is provided to illustrate the invention, and is not to be construed as a limitation. Numerous additions, substitutions and other changes can be made to the invention without departing from its scope as set forth in the appended claims.

I claim:

1. A position measuring arrangement, comprising:
 a scale comprising a graduation which can be light-electrically scanned;
 a scanning head comprising:
 a light source that generates a light beam along a light beam path; and
 a detector, wherein said scale is arranged in said light beam path between said light source and said detector, and said detector generates a scanning signal;
 a control device that makes a comparison of an amplitude of said scanning signal with a predetermined level, wherein said control device differentiates as to whether said amplitude lies above or below said predetermined level;
 an attenuator in said light beam path for reducing said amplitude of said scanning signal in order to generate an indication, via said comparison of said amplitude of said scanning signal with said predetermined level, whether or not a setting of said scanning head relative to said scale is permissible for correct position measurement.

2. The position measuring arrangement in accordance with claim 1, wherein said attenuator comprises a light filter for damping said beam of light.

3. The position measuring arrangement in accordance with claim 2, wherein said light filter is removably arranged on said scanning head.

4. The position measuring arrangement in accordance with claim 2, wherein said light filter is removably arranged on a surface of said scale.

5. The position measuring arrangement in accordance with claim 1, wherein said attenuator is embodied as a calibration device for setting a distance between said scanning head and said scale.

6. The position measurement arrangement in accordance with claim 1, wherein said attenuator is movable to a retracted position so that said attenuator is not present in said light beam.

7. The position measurement arrangement in accordance with claim 6, wherein when said attenuator is moved to said retracted position said control device generates in the course of said comparison an indication whether said scanning signal can be used for position measuring.

8. A method for controlling a scanning signal of a light-electric position measuring arrangement, the method comprising:
 wherein in a first mode of operation said method comprising:
 providing said scanning signal to a control device;
 said control device comparing an amplitude of said scanning signal with a predetermined level and makes a differentiation as to whether said amplitude lies above or below said predetermined level;
 wherein in a second mode of operation said method comprises:
 reducing said amplitude of said scanning signal by attenuating light within a light beam path, and said reduced amplitude is compared with said predetermined level; and
 generating an indication which is suitable for controlling a basic setting of a scanning head relative to a scale.

9. The method in accordance with claim 8, wherein in said second mode of operation said amplitude is reduced by at least 50%.

10. The method in accordance with claim 9, wherein in said second mode said amplitude is reduced by introducing a light filter into said light beam path.

11. The method in accordance with claim 8, wherein in said first mode said control device generates in the course of said comparison an indication whether said scanning signal can be used for position measuring.

* * * * *